United States Patent [19]

Stawitz et al.

[11] Patent Number: 5,279,622
[45] Date of Patent: Jan. 18, 1994

[54] SOLID DYESTUFF PREPARATIONS HAVING IMPROVED WATER SOLUBILITY

[75] Inventors: Josef-Walter Stawitz; Frank-Michael Stöhr; Joachim Wolff, all of Odenthal, Fed. Rep. of Germany

[73] Assignee: Bayer Aktiengesellschaft, Leverkusen, Fed. Rep. of Germany

[21] Appl. No.: 875,164

[22] Filed: Apr. 28, 1992

[30] Foreign Application Priority Data

May 4, 1991 [DE] Fed. Rep. of Germany ....... 4114587

[51] Int. Cl.$^5$ .............................................. C09B 47/04
[52] U.S. Cl. ........................................ 8/661; 540/123; 540/124; 540/125; 540/126; 8/658; 8/644
[58] Field of Search ............... 540/123, 124, 125, 126, 540/127; 8/661

[56] References Cited

U.S. PATENT DOCUMENTS

| | | | |
|---|---|---|---|
| 4,198,268 | 4/1980 | Frei et al. | 8/661 |
| 4,227,880 | 10/1980 | Hohenegger et al. | 8/661 |
| 4,246,174 | 1/1981 | Groll | 540/125 |
| 4,802,888 | 2/1989 | Sandefur et al. | 8/661 |
| 5,051,501 | 9/1991 | Schundehutte et al. | 540/125 |
| 5,070,193 | 12/1991 | Schundehu et al. | 540/125 |

FOREIGN PATENT DOCUMENTS

| | | | |
|---|---|---|---|
| 0024654 | 3/1981 | European Pat. Off. | 540/126 |
| 0255890 | 2/1988 | European Pat. Off. | 540/127 |
| 1127324 | 6/1959 | Fed. Rep. of Germany | 540/126 |
| 3426008 | 1/1986 | Fed. Rep. of Germany | 540/125 |
| 2388027 | 11/1988 | France | 8/661 |
| 482000 | 11/1969 | Switzerland | 8/661 |
| 917942 | 6/1958 | United Kingdom | 8/661 |
| 880393 | 7/1959 | United Kingdom | 8/661 |

OTHER PUBLICATIONS

AN:85-321670, "Formazan Compound Dye Textile High Fast Preparation . . . ", Derwent Pub. Apr. 1984.
Grant and Hadkh's Chemical Dictionary (New York McGraw-Hill Books, 1981) pp. 268 and 469.

Primary Examiner—Mukund J. Shah
Assistant Examiner—P. K. Sripada
Attorney, Agent, or Firm—Sprung Horn Kramer & Woods

[57] ABSTRACT

Solid dyestuff preparations of reactive phthalocyanine dyestuffs of the formula

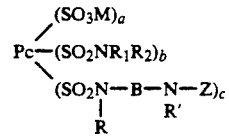

in which the substituents have the meaning given in the description, have improved solubility in water if they contain 5 to 15% by weight of an acid-binding agent.

3 Claims, No Drawings

SOLID DYESTUFF PREPARATIONS HAVING IMPROVED WATER SOLUBILITY

The invention relates to solid dyestuff preparations of reactive phthalocyanines having improved solubility in water. Dyestuff preparations can be present in solid or in liquid form For example, EP-A-217,217 discloses liquid preparations of reactive dyestuffs, phthalocyanines being mentioned EP-A-59,782 relates to a process for the preparation of concentrated aqueous dyestuff preparations in which phthalocyanines are expressly mentioned, see Example 14. Furthermore, it is known from U.S. Pat. No. 4,802,888 to improve the water solubility of anionic dyestuffs by using a chelating agent and a Lewis base in such an amount that a pH of 7 to 10 is reached upon dissolution of the preparation in water. However, phthalocyanine dyestuffs are not mentioned in U.S. Pat. No. 4,802,888.

The object of the present invention is to provide improved solid dyestuff preparations of reactive phthalocyanine dyestuffs with respect to handling and stability.

The invention relates to solid preparations of reactive dyestuffs of the formula

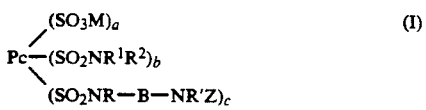

(I)

in which

Pc is the radical of a copper phthalocyanine or nickel phthalocyanine, $R^1$, $R^2$ are H, substituted or unsubstituted $C_1$–$C_4$-alkyl or together a 5- or 6membered ring which may contain one or more heteroatoms, R′, R are H, substituted or unsubstituted alkyl, B is a bridging member, $C_1$–$C_8$-alkylene substituted or unsubstituted or which is interrupted by at least one heteroatom or substituted or unsubstituted phenylene, a is 1.0 to 3.0, preferably 1.8 to 2.7, b is 0 to 1.2, c is 0.5 to 2.0, preferably 1.0 to 1.5, M is H, $NH_4$, Li, Na, K, Z is a heterocyclic radical, the radicals $R^1$ and $R^2$ and R and R′, independently of one another, having the meaning given, characterized in that the preparations contain 5 to 15% by weight of an acid-binding agent In a preferred embodiment, the acid-binding agent is LiOH, NaOH, KOH, $Li_2CO_3$, $Na_2CO_3$ or $K_2CO_3$ being particularly preferred.

The new dyestuff preparations can be prepared as follows:

a) The dyestuff is precipitated after its preparation from the reaction solution by addition of salts, isolated, dried and milled. It is then mixed with standardizing agent, dustproofing agent and acid-binding agent.

b) The dyestuff is precipitated from the reaction solution by addition of acid, isolated and taken up in water. The acid-binding agent is then added, the dyestuff solution is subjected to pressure permeation, as a result of which it is concentrated and desalted and finally spray-dried with the addition of standardizing agents.

c) as a) but desalted by pressure permeation d) as b) but spray-dried without pressure permeation Dyestuffs of the formula I are disclosed, for example, in DE-A 1,644,681 and DE-A 3,843,558.

In a particularly preferred embodiment chelating reagents, such as are required, for example, according to U.S. Pat. No. 4,802,888, are not used in the claimed solid dyestuff preparations.

Before and/or after drying, customary standardizing agents can be admixed. Drying can be carried out, for example, in a through-circulation oven, by means of a paddle drier or drum drier, but preferably by spray-drying using a single- or two-component nozzle or a spray disc. In spray-drying, the concentration of the solids in water is usually 10 to 45% by weight.

Heterocyclic reactive radicals in formula (I) are understood to mean those which have one or more reactive groups or detachable substituents which upon application of the dyestuffs to cellulose materials are capable of reacting with the hydroxyl groups of cellulose in the presence of acid-binding agents, if appropriate with exposure to heat, or upon application to superpolyamide fibers, such as wool, with the NH groups of these fibers to form covalent bonds.

Suitable reactive groups containing at least one detachable substituent bound to a heterocyclic radical are, inter alia, those containing at least one reactive substituent bound to a 5- or 6-membered heterocyclic ring, such as to a monazine, diazine, triazine, for example pyridine, pyrimidine, pyridazine, thiazine, oxazine or unsymmetrical or symmetrical triazine ring, or to a ring system of this type, which has one or more fused-on rings, such as a quinoline, phthalazine, cinnoline, quinazoline, quinoxaline, acridine, phenazine and phenanthridine ring system; accordingly, preferred 5- or 6-membered heterocyclic rings containing at least one reactive substituent are those containing one or more nitrogen atoms and possibly 5- or preferably 6-membered fused-on carbocyclic rings.

Of the reactive substituents on the heterocycle, the following examples may be mentioned Halogen (Cl, Br or F), azido (—$N_3$), thiocyanato, thio, thioethers, oxyethers.

In the case of the present invention, preference is given to reactive dyestuffs containing reactive groups based on the following systems:

Mono- or dihalogeno- symmetrical triazinyl radicals, mono-, di- or trihalogenopyrimidinyl radicals.

Examples of concentration-increasing additives which can be used in the synthesis of the preparations are: lower aliphatic or cyclic amides, such as ε-caprolactam, and/or sulphur-containing compounds, such as dimethyl sulphone, diethyl sulphone and/or hydrotropic compounds, such as thiourea, urea, and the corresponding derivatives, particularly preferably N,N′-dimethylurea.

Suitable acid-binding agents are preferably alkalis, such as $Na_2CO_3$, $K_2CO_3$, LiOH, $Li_2CO_3$, but in particular LiOH and $Na_2CO_3$. The pH is preferably brought to 9.5 –10.5 by means of the acid-binding agents.

Suitable customary standardizing agents are solid compounds which do not undergo any reaction with the reactive group, for example, inorganic salts, particularly preferably LiCl, $Li_2SO_4$ or polyphosphates, but preferably non-electrolytes, such as polyvinylpyrrolidone, urea, salts of water-soluble aromatic sulphonic acid, such as benzenesulphonic acid and anionic dispersants, such as sulphated primary or secondary aliphatic alcohols having 10 to 18 carbon atoms, sulphated fatty acid amides, sulphated alkylene oxide adducts, sulphated partially esterified polyhydric alcohols, and in particular sulphonates, such as long-chain alkyl sulphonates, for example lauryl sulphonates, cetyl sulphonate, stearyl sulphonate, mersolates, sodium dialkyl sulphosuccinates, such as sodium dioctyl sulphosuccinate, taurides, for example oleylmethyltauride, (sodium salt), alkylaryl sulphonates, such as alkylbenzenesulphonates, having a straight-chain or branched alkyl chain containing 7 to 20 carbon atoms, and mono- and dialkylnaphthalenesulphonates, such as nonylbenzenesulphonate, dodecylbenzenesulphonate and hexadecylbenzenesulphonate, and 2-isopropylnaphthalene-2-sulphonate, di-iso-propylnaphthalenesulphonate, di-n-butyl-naphthalenesulphonate, diisobutylnaphthalenesulphonate and in particular condensation products of aromatic sulphonic acids with formaldehyde, such as naphthalenesulphonic acid, ditolyl ether sulphonic acids or terphenylsulphonic acid with formaldehyde and/or condensation products of formaldehyde, cyclohexanone and bisulphite and/or lignosulphonates. Furthermore, customary dustproofing agents, such as oils, oil/emulsifier mixtures or phthalic esters can be added.

The preparations of reactive dyestuffs prepared by the process according to the invention preferably have the following composition:

The reactive dyestuff content in the preparation prepared according to the invention is 20–80% by weight (preferably 30–70% by weight); furthermore, the formulation contains 5–15% of alkali metal hydroxide or alkali metal carbonate for a pH of 9–11, furthermore, if desired, 10–60% of a concentration-increasing additive, 0–50% of the customary standardizing agents or mixtures thereof, and up to 4% of dustproofing agent.

The solubility of reactive dyestuffs, in particular in the presence of electrolytes, plays a significant role in modern dyeing processes.

The invention furthermore relates to the use of the preparations prepared in this manner of the reactive dyestuffs having excellent solubility for the preparation of dyebaths and printing pastes for use on natural and synthetic substrates, in particular cotton, wool, regenerated cellulose, paper and leather. The standardizing agents are preferably added before drying, but can also be milled and mixed with the dyestuff after drying or added to the milled dyestuff.

The preparations prepared according to the invention are distinguished by excellent solubility in hot and cold water.

EXAMPLE 1

A solid dyestuff preparation which is readily soluble in water, after which it has a pH of 9.8, is obtained by powdering and mixing

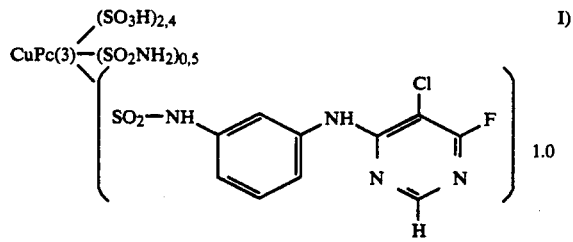

10.0 g of the salt-free dyestuff of the formula I)
3.0 g of sodium chloride
2.0 g of calcined sodium carbonate and
5.0 g of a standardizing agent (naphthalenesulphonate).

Compared with customary powder formulations, it has significantly improved solution properties, in particular in the presence of electrolytes.

|  | Example 1 | Comparison without addition of $Na_2CO_3$ |
|---|---|---|
| Solubility at 40° C. containing 50 g/l of $Na_2SO_4$ | >40 g/l | 1 g/l |
| Solubility at 40° C. containing 50 g/l of NaCl | >30 g/l | 0.5 g/l |

Similar results are obtained using:

$$NiPc(3) \underset{SO_2-NH}{\overset{(SO_3H)_{2.8}}{\diagup}} \left\{ \text{...structure II...} \right\}_{1.0} \quad II)$$

$$CuPc(3) \underset{SO_2-NH}{\overset{(SO_3H)_{2.4}}{\underset{(SO_2NH_2)_{0.5}}{\diagup}}} \left\{ \text{...structure III...} \right\}_{1.0} \quad III)$$

$$NiPc(3) \underset{SO_2-NH}{\overset{(SO_3H)_{2.8}}{\diagup}} \left\{ \text{...structure IV...} \right\}_{1.0} \quad IV)$$

-continued

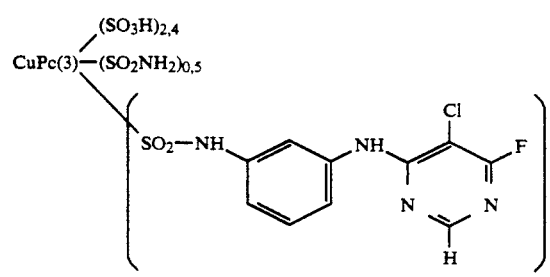

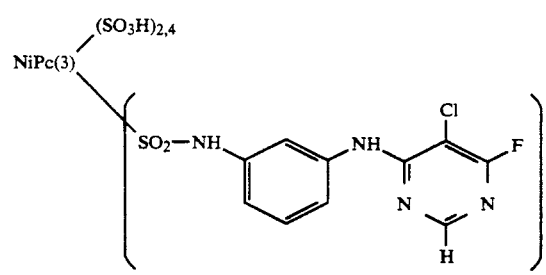

We claim:

1. Solid preparations of reactive dyestuffs of at least one of the following formulae

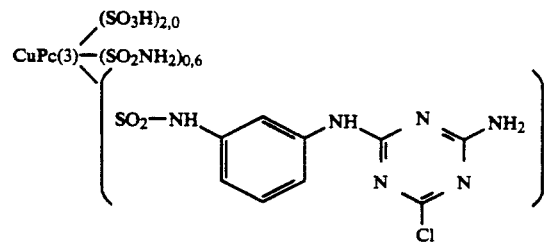

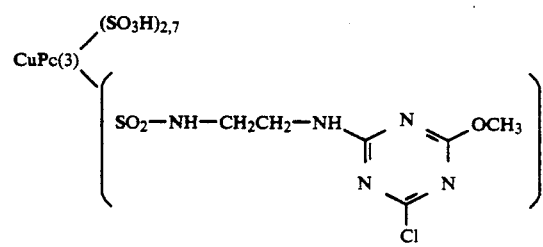

-continued

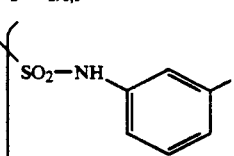

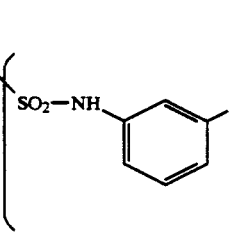

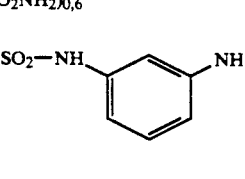

and

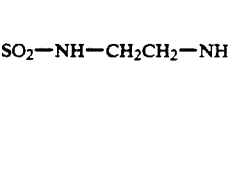

the preparations containing 5 to 15% by weight of an acid-binding agent.

2. Solid preparations according to claim 1, characterized in that the acid-binding agent is LiOH, NaOH, KOH, $Li_2CO_3$, $Na_2CO_3$ or $K_2CO_3$.

3. Solid preparations according to claim 1, characterized in that the acid-binding agent is $Na_2CO_3$.

* * * * *

UNITED STATES PATENT AND TRADEMARK OFFICE
CERTIFICATE OF CORRECTION

PATENT NO : 5,279,622

DATED : January 18, 1994

INVENTOR(S): Stawitz, et al.

It is certified that error appears in the above-identified patent and that said Letters Patent is hereby corrected as shown below:

Column 6, line 15, cancel the structural formula

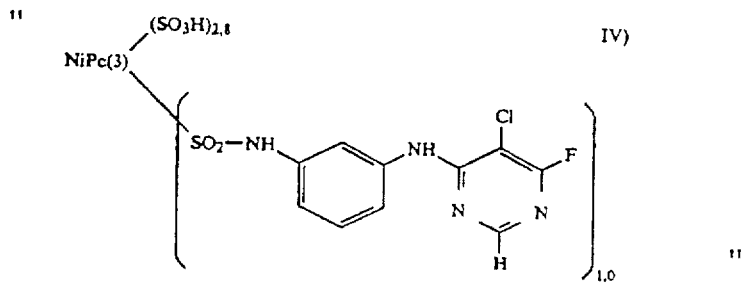

and substitute

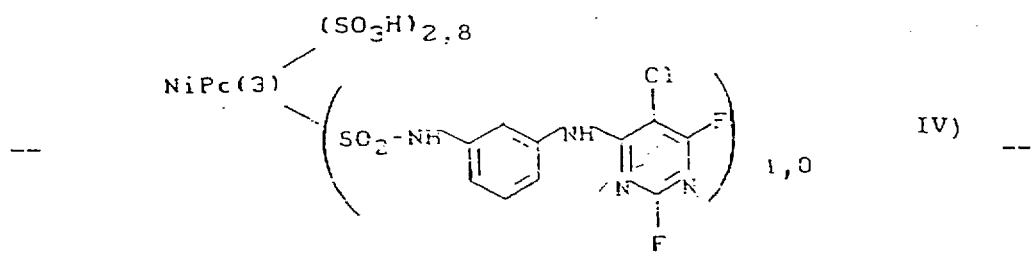

UNITED STATES PATENT AND TRADEMARK OFFICE
CERTIFICATE OF CORRECTION

PATENT NO : 5,279,622

DATED : January 18, 1994

INVENTOR(S): Stawitz, et al.

It is certified that error appears in the above-identified patent and that said Letters Patent is hereby corrected as shown below:

Column 6, line 35, cancel the structural formula

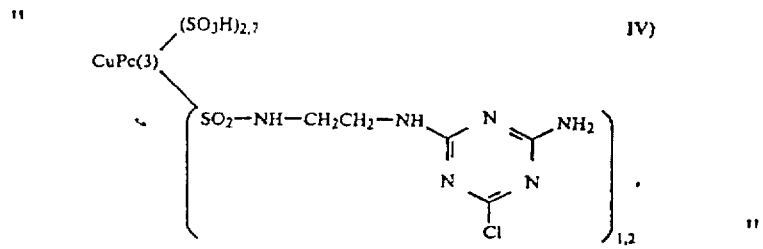

and substitute

UNITED STATES PATENT AND TRADEMARK OFFICE
CERTIFICATE OF CORRECTION

PATENT NO. : 5,279,622
DATED : January 18, 1994
INVENTOR(S) : Stawitz, et al.

It is certified that error appears in the above-indentified patent and that said Letters Patent is hereby corrected as shown below:

and substitute

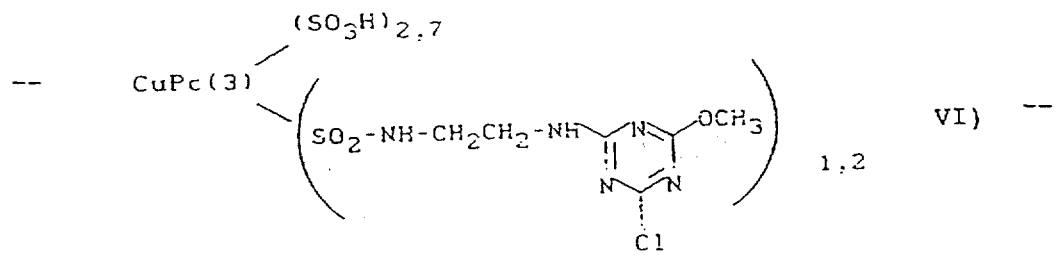

Signed and Sealed this

Second Day of November, 1999

Attest:

Q. TODD DICKINSON

Attesting Officer    Acting Commissioner of Patents and Trademarks